United States Patent [19]

Pepper

[11] 4,269,230
[45] May 26, 1981

[54] CLOSURE MEMBER

[75] Inventor: Kenneth V. Pepper, Davison, Mich.

[73] Assignee: Genova, Inc., Davison, Mich.

[21] Appl. No.: 15,332

[22] Filed: Feb. 26, 1979

[51] Int. Cl.³ ............................................. F16L 55/10
[52] U.S. Cl. ...................................... 138/89; 220/307; 220/327
[58] Field of Search ...................... 138/89, 96 R, 96 T; 220/307, 327, 328, 378

[56] References Cited

U.S. PATENT DOCUMENTS

| 908,893 | 1/1909 | Shade | 138/89 |
|---|---|---|---|
| 1,951,645 | 3/1934 | Boosey | 138/89 X |
| 2,729,231 | 1/1956 | Quest | 138/89 X |
| 3,313,320 | 4/1967 | Clure | 138/89 |
| 3,392,640 | 7/1968 | Zeile | 94/34 |
| 3,549,186 | 12/1970 | Larsen | 220/327 X |
| 3,675,685 | 7/1972 | Potter | 138/89 |
| 3,677,301 | 7/1972 | Williams | 138/89 X |
| 3,765,456 | 10/1973 | Karpenko | 138/89 |
| 3,805,992 | 4/1974 | Jorgensen | 220/327 X |
| 4,088,149 | 5/1978 | Logsdon | 138/89 X |

Primary Examiner—James E. Bryant, III

Attorney, Agent, or Firm—Gifford, VanOphem, Sheridan & Sprinkle

[57] ABSTRACT

An improved closure member is provided for sealing the open end of a pipe and which is particularly suited for a plastic pipe system. The closure member comprises a tubular cylindrical body closed at one end and which is insertable into the open end of a pipe. An O-ring around the closure member engages the inner periphery of the pipe and fluidly seals the closure member to the pipe while an enlarged diameter flange at the outer end of the closure member abuts against the open end of the pipe in order to prevent over insertion of the closure member into the pipe. At least one and preferably two axially extending channels are formed along the outer periphery of the closure member which are open to the outer end of the closure member through the enlarged diameter flange. Threaded fasteners are then screwed into the flange opening of the closure member and are dimensioned so that the threads embed into both the closure member about its axially extending channel and also into the inner periphery of the pipe in order to securely, but detachably, fasten the closure member to the pipe.

8 Claims, 5 Drawing Figures

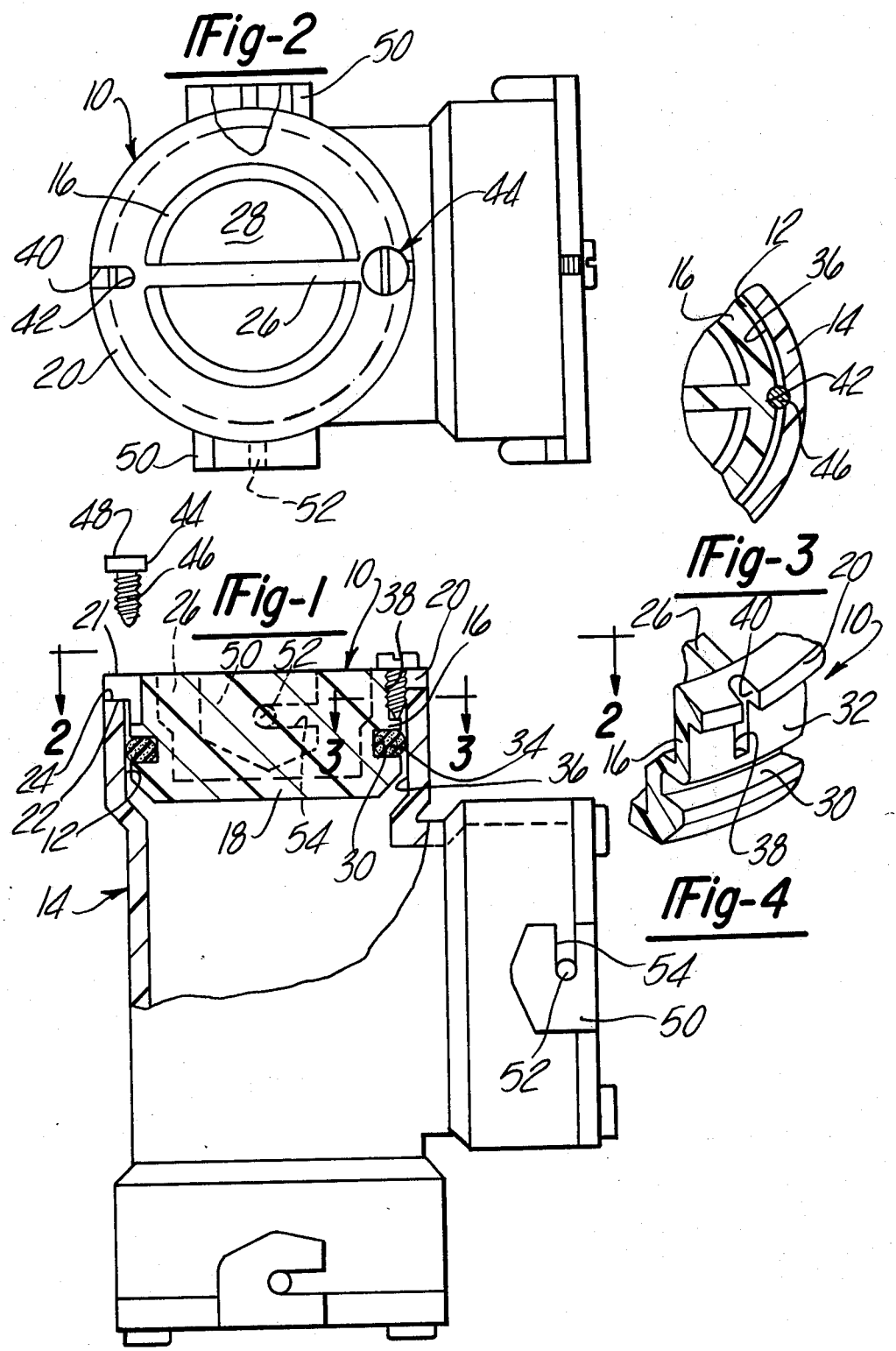

CLOSURE MEMBER

BACKGROUND OF THE INVENTION

I. Field of the Invention

The present invention relates generally to closure members and, more particularly, to a closure member for a plastic pipe system.

II. Description of the Prior Art

There are a number of previously known closure members which removably close an access opening in a pipe system. Oftentimes the access opening is used as a clean out opening.

Many of these previously known closure members have been externally threaded and cooperate with an internally threaded pipe fitting. Closure members of this type, however, are disadvantageous in that they are both difficult to install and remove and also oftentimes inadequately seal the closure member to the pipe fitting.

One previously known threadless closure member, however, is described in U.S. Pat. No. 3,677,301 which issued on July 18, 1972, and which is commonly owned by the Assignee of the instant application. This previously known threadless closure member is particularly suited for plastic pipe systems and comprises a cylindrical tubular body closed at one end and axially insertable into the pipe access opening. This previously known closure member further included a pair of locking tabs which extended axially along the outer periphery of the pipe fitting following insertion of the closure member into the access opening while a circumferentially extending slot open at one end is formed in each locking tab. The pipe further included a pair of outwardly extending pins so that following insertion of the closure member into the access opening and the subsequent rotation of the closure member, the pins are received within the locking tab slots to lock the closure member against unintended axial displacement of the closure member.

One disadvantage of this previously known closure member, however, is that the closure member can withstand only a predetermined amount of fluid pressure before either the locking tabs and/or the outwardly projecting pins from the pipe break apart due to the force from the fluid pressure. Moreover, many building codes and restrictions for high rise building constructions require that the closure member be able to sustain the water pressure resulting from a head of water of a height equal to the building construction although, in practice, the closure member is never subjected to such high fluid pressures.

Although it would be possible, of course, to increase the size of both the locking tabs and their associated pins in order to increase the fluid pressure capability of the closure member, to do so unduly increases the overall cost of both the pipe fitting and the closure member and is economically infeasible.

SUMMARY OF THE PRESENT INVENTION

The present invention overcomes the above mentioned disadvantages of the previously known closure members for pipe access openings by providing such a closure member which is inexpensive in construction, easy to install and remove when desired and yet capable of withstanding fluid pressure either found or required in building codes for high rise building constructions.

In brief, the closure member according to the present invention comprises a tubular cylindrical body which is closed at one axial end and which is adapted to be axially inserted into an access opening of a pipe fitting. An O-ring disposed around the closure member provides a fluid seal between the closure member and the pipe fitting while an enlarged diameter flange at the other axial end of the closure member abuts against the pipe fitting and prevents over insertion of the closure member.

A pair of diametrically opposed and axially extending channels are formed along the outer periphery of the closure member between the fluid seal and the enlarged diameter flange. Each channel registers with and is open through a radial slot in the flange so that the channel is spaced inwardly from the interior of the pipe fitting and is accessible after the closure member is inserted into the access opening.

A fastener having external threads is then screwed into each of the channels. The fastener is dimensioned so that its threads at least partially embed into both the closure member and the interior wall of the pipe fitting so that, upon tightening, the threaded fasteners securely fasten the closure member to the pipe fitting. Removal of the threaded fasteners, of course, permits removal of the closure member when desired.

In one form of the invention, the closure member further includes locking tabs which engage outwardly protruding locking pins from the pipe upon insertion and rotation of the closure member. With this form of the invention, the closure member can be used without the threaded fasteners when only low fluid pressures are encountered while still permitting the use of the closure members for high fluid pressure applications.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a partial sectional view illustrating the closure member of the present invention installed in an access opening of a pipe fitting;

FIG. 2 is a plan view taken substantially along line 2—2 in FIG. 1;

FIG. 3 is a fragmentary sectional view taken substantially along line 3—3 in FIG. 1;

FIG. 4 is a fragmentary partial sectional view illustrating a portion of the closure member of the present invention.

DETAILED DESCRIPTION OF THE PRESENT INVENTION

Figure 5:
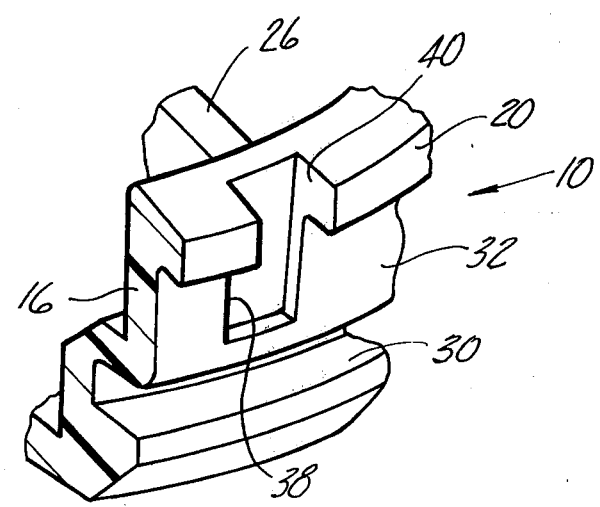
FIG. 5 is a fragmentary partial sectional view illustrating a portion of the closure member showing an axial channel of square cross section.

With reference first to FIGS. 1 and 2, the closure member 10 according to the present invention is thereshown for use with an access opening 12 of a pipe fitting 14. The access opening 12 can, for example, comprise a clean out opening for the fluid system in which the pipe fitting 14 is connected. In addition, both the closure member 10 and the pipe fitting 14 are preferably constructed of a plastic material.

The closure member 10 is preferably of a one-piece construction and includes a tubular cylindrical body 16 closed at one end 18 and dimensioned to be insertable into the access opening 12 of the pipe fitting 14. An outwardly extending flange 20 (FIG. 4) at its other or outer axial end 21, however, forms an annular abutment surface 22 which abuts against the open end 24 of the pipe fitting 14 to prevent over insertion of the closure member 10 into the pipe fitting 14. A rib 26 also extends diametrically across the open interior 28 of the closure member 10 to aid in the manipulation of the closure plug 10 for its insertion into and removed from the access opening 12.

With reference now to FIGS. 1 and 4, an annular groove 30 having a rectangular cross-sectional shape is formed around the outer periphery 32 of the closure member body 16 adjacent its closed end 18. A resilient seal member 34 is positioned and retained within the groove 30 so that upon insertion of the closure member 10 into the access opening 12, the seal member 34 compresses and sealingly engages the inner periphery 36 of the pipe fitting 14. Moreover, as is best shown in FIG. 1, the seal member 34 is porous which has been found to provide a good seal between the closure member 10 and the pipe fitting 14 despite prolonged use.

With reference still to FIGS. 1 and 4, an axially extending channel 38 shown as having a square cross-sectional shape is formed along the outer periphery of the closure member body 16 between the seal member 34 and the outer axial end 21 of the closure member 10. Each channel 38 registers with a radially extending slot 40 (FIGS. 2 and 4) formed through the flange 20 and is open to the outer periphery of the flange 20. Thus, each channel 38 is accessible exteriorly of the closure member 10 after insertion into the access opening 12 of the pipe fitting 14 and, as viewed from the outer axial end 21 of the closure member 10, forms an axially extending and inwardly spaced wall portion 42 (FIGS. 2 and 3) with respect to the inner periphery 36 of the pipe fitting 14. Moreover, each channel 38 is aligned with one end of the rib 26 which thus reinforces the closure member 10 about the channels 38.

Referring now to FIGS. 1-3, a pair of screws 44 are provided for securing the closure member 10 to the pipe fitting 14 once it has been inserted into the access opening 12. In the conventional fashion, each screw 44 includes an externally threaded shank 46 and an enlarged head 48. The shank 46 of each screw is screwed between the channel 38 and the interior 36 of the pipe fitting 14 until the enlarged head 48 of the screw 44 abuts against the outer axial end 21 of the flange 20. Moreover, the screw shank 46 is dimensioned so that its external threads embed in both the closure member 10 about the axially extending channel 38 and also in the interior wall 36 of the pipe fitting 14 thus securely, but detachably, fastening the closure member 10 to the pipe fitting 14.

With the closure member 10 secured to the pipe fitting 14 by the screws 44 in the above described fashion, the closure member 10 is able to withstand the high fluid pressures either found in or required by the building codes and restrictions for high rise building constructions. Moreover, when desired, the closure member 10 can be easily and rapidly removed from the pipe fitting 14 by merely unscrewing the screws 44 and pulling the closure member 10 axially outwardly from the pipe fitting 14. Furthermore, it will be appreciated that since the screw 44 is threaded between the interior wall 36 of the pipe fitting and the axial extending channel 38, the closure member 10 can be secured to the pipe fitting 14 by the screws 44 regardless of the rotational position of the closure member 10 with respect to the pipe fitting 14.

With reference to FIGS. 1 and 2, the closure member 10 can also include locking tabs 50 which engage locking pins 52 projecting radially outwardly from the outer periphery of the pipe fitting 14 in the manner more fully described in the aforementioned U.S. Pat. No. 3,677,301. In brief, however, the locking members 50 form a part of the closure member 10 and extend axially along the outer periphery of the pipe fitting 14. Each locking member 50 includes a circumferentially extending slot 54 while the locking pins 52 are formed as a part of and project radially outwardly from the outer periphery of the pipe fitting 14. The locking pins 52 are positioned on the pipe fitting 14 so that after insertion of the closure member 10 into the access opening 12, rotation of the closure member 10 rotates the locking tab slots 54 around the locking pins 52 as best shown in FIG. 1.

The inclusion of the locking members 50 on the closure member 10 is advantageous in that it permits the closure member 10 to be used in both high fluid pressure and low fluid pressure applications. For example, where the closure member 10 is used in a low fluid pressure application, only the locking members 50 and the locking pins 52 are used to secure the closure member 10 to the pipe fitting 14 and the screws 44 are simply omitted. Conversely, when the closure member 10 is used with a high fluid pressure application, the closure member 10 is inserted into the access opening 12 and rotated until the locking members 50 engage their pins 52 before the screws 44 are screwed between the closure member body 16 and the interior of the pipe fitting 14.

From the foregoing it can be seen that the closure member 10 according to the present invention provides a novel, inexpensive and yet effective means for fluid closing an access opening of a pipe fitting and which is suitable for use in high fluid pressure applications.

Having described my invention, however, many modifications thereto will become apparent to those skilled in the art to which it pertains without deviation from the spirit of the invention as defined by the scope of the appended claims.

I claim:

1. In combination with a tubular plastic pipe having an open axial end with a non-threaded, continuously smooth cylindrical, inner peripheral wall, a plastic closure member for closing the open end of the pipe, said closure member comprising:

a body, said body having a part insertable into the interior of the pipe, the outer periphery of the insertable part having a non-threaded surface area spaced inwardly from the interior of the pipe at least along a portion of the outer periphery of the body insertable part and axially for at least a predetermined distance, wherein said inwardly spaced area is an axially extending channel formed along said outer periphery; and at least one externally threaded member, said threaded member being threadably received between said inwardly spaced surface area and the inner periphery of said pipe, said threaded member being dimensionsed so that its external threads at least partially embed in both said pipe and said body insertable part of said closure member to thereby secure said closure member to said pipe.

2. The invention as defined in claim 1 wherein said closure member body further comprises an outwardly extending flange at one end, said flange forming an abutment surface which abuttingly engages the open axial end of the pipe upon insertion of the insertable part into the pipe.

3. The invention as defined in claim 2 wherein said pipe includes a pair of pins which extend outwardly from the outer periphery of the pipe adjacent the open end of the pipe and wherein said closure member further comprises a pair of locking tabs secured to said body, each locking tab having a circumferentially extending slot open at one end, said slot being positioned on said locking tabs so that said pins are received in the slots upon the insertion of the insertable part into the pipe and subsequent rotation of the closure member with respect to the pipe.

4. The invention as defined in claim 1 and including a resilient seal disposed around the insertable part which sealingly engages the inner periphery of the pipe.

5. The invention as defined in claim 1 wherein said body is substantially tubular and cylindrical in shape, said inwardly spaced portion further comprising a pair of axially extending channels formed along the outer periphery of the insertable part.

6. The invention as defined in claim 5 wherein said body includes a reinforcing rib extending between the channels.

7. The invention as defined in claim 6 wherein said channels are formed on diametrically opposite sides of the body.

8. The invention as defined in claim 1 wherein said axially extending channel is square in cross section.

* * * * *